F. R. GRAHAM-YOOLL.
MOUTHPIECE FOR FEEDING BOTTLES.
APPLICATION FILED MAR. 4, 1918.
1,306,303.
Patented June 10, 1919.
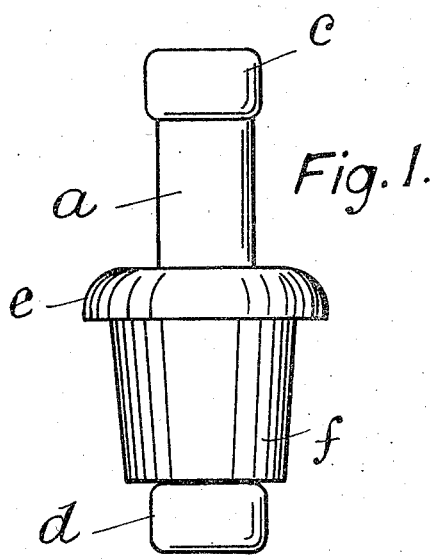
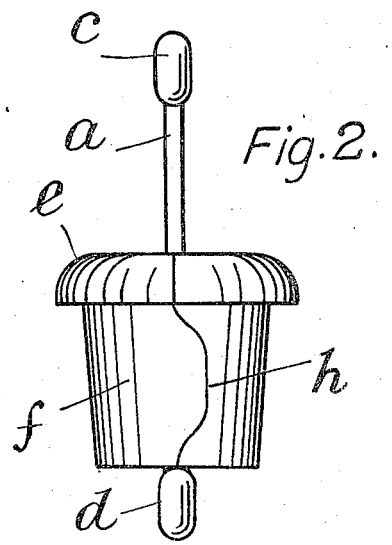
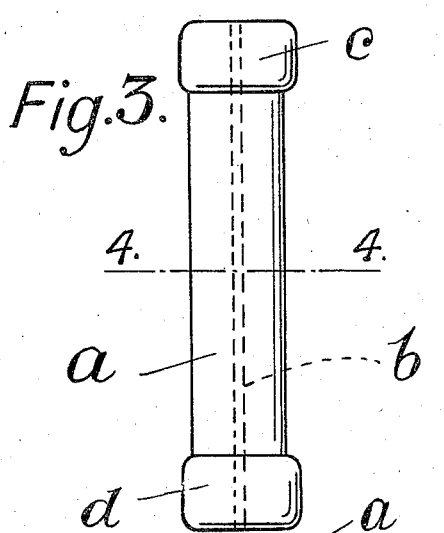
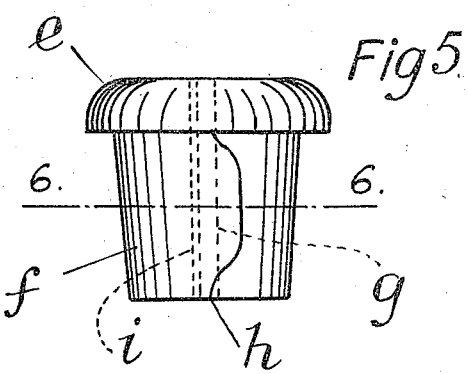
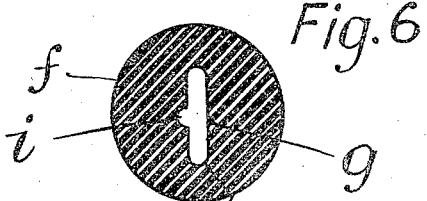
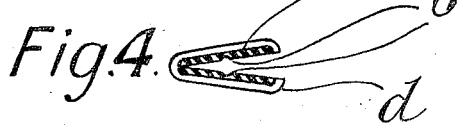

UNITED STATES PATENT OFFICE.

FREDERICK RICHARD GRAHAM-YOOLL, OF LEITH, SCOTLAND.

MOUTHPIECE FOR FEEDING-BOTTLES.

1,306,303. Specification of Letters Patent. Patented June 10, 1919.

Application filed March 4, 1918. Serial No. 220,231.

*To all whom it may concern:*

Be it known that I, FREDERICK RICHARD GRAHAM-YOOLL, a subject of the King of the United Kingdom of Great Britain and Ireland, and resident of Dulham Towers, East Trinity Road, Leith, Scotland, iron merchant and contractor, have invented certain new and useful Improvements in Mouthpieces for Feeding-Bottles, of which the following is a specification.

This invention relates to mouthpieces or teats for feeding bottles and the like and one object of the invention is to provide an improved mouthpiece or teat capable of being opened up so as to expose the food passage and thereby facilitate thorough cleaning.

A further object of the invention is to provide a restricted food passage for regulating the flow without the necessity for the pin hole ordinarily provided in the tip of the teat.

A further object of the invention is to provide an improved stopper or attachment by means of which the teat is secured in the mouth of the feeding bottle or other food container.

In accordance with this invention the mouthpiece is adapted to fold or roll upon itself and has an internal food passage capable of being readily opened up to permit of cleaning.

The stopper is preferably made in the form of a plug having a bore or passage for the teat and having a side slit or opening so that it may be opened up to permit of the introduction or withdrawal of the teat.

In order that this invention may be clearly understood I have hereunto appended an explanatory drawing showing the improved device.

Figure 1 is a side view of the complete device.

Fig. 2 is a similar view but looking at right angles to Fig. 1.

Fig. 3 is a side view of the teat part.

Fig. 4 is a cross section of the same taken on the line 4, 4, Fig. 3.

Fig. 5 is a view of the stopper part.

Fig. 6 is a cross section taken on the line 6, 6, Fig. 5.

The teat part $a$ consists of a flat strip of rubber or other like material folded upon itself and having on each inner face shallow grooves $b$ which coincide and form the food passage when the teat is closed. The ends of the teat are provided with thickened or reinforced parts $c$, $d$ which are preferably similar to each other so that the teat is reversible. Fig. 4 shows the teat opened to expose the food passage for cleaning purposes.

The stopper has a shoulder part $e$ and a plug part $f$ and has a central bore or opening $g$ for the teat. At one side thereof the stopper is split or cut at $h$ on a curved line so that the engaging faces of the split part are retained in their proper relative positions when the stopper is closed. In line with the grooves $b$ the bore or opening $g$ has a groove $i$ which prevents the pressure of the stopper from closing the milk passage and at the same time serves as a passage for the admission of air to the food container.

Instead of being flat the teat may be of oval, round or other suitable cross section.

Claims:

1. A teat for feeding-bottles, consisting of a strip of suitable material folded longitudinally upon itself, and a groove on the inner face of each fold forming an internal passage longitudinally through the teat.

2. A teat for feeding bottles consisting of a rubber strip folded upon itself and having longitudinal grooves in the internal faces thereof for the passage of the food.

3. A teat for feeding-bottles, consisting of a strip of suitable material folded longitudinally upon itself, and a groove on the inner face of each fold forming an internal passage longitudinally through the teat, said teat having an increased thickness at its discharge end to provide a nipple.

4. A teat for feeding bottles consisting of a rubber like piece folded upon itself, internal grooves for the passage of food, and a stopper for the attachment thereof to the food container.

5. A teat for feeding bottles consisting of a rubber like member closed upon itself and having internal grooves for the passage of the milk, a stopper for the attachment to the food container, an opening in such stopper for the reception of the teat and a passage in the stopper for the introduction of air to the food container.

6. A teat for feeding-bottles, consisting of a rubber strip folded longitudinally upon itself, a groove on the inner face of each fold forming an internal passage longitudinally through the teat, said strip having an increased thickness of material at its respective ends to provide a nipple on each end of the teat, a stopper having a longitudinal opening in the center thereof adapted to receive the strip, and a radial slit in the side of the stopper communicating with the center slit whereby the strip may be inserted within the stopper, said stopper adapted to engage the mouth of a food container with one end of the strip extending within the container.

FREDERICK RICHARD GRAHAM-YOOLL.

Witnesses:
JAMES AIKEN,
ELIZABETH CRAIG.

Copies of this patent may be obtained for five cents each, by addressing the "Commissioner of Patents, Washington, D. C."